(12) United States Patent
McDougall

(10) Patent No.: US 8,869,465 B2
(45) Date of Patent: Oct. 28, 2014

(54) PROCESS FOR PROVIDING EMERGENCY HOUSING FOR A PLURALITY OF DISPLACED PEOPLE

(75) Inventor: Neil Clyde McDougall, Cranbourne (AU)

(73) Assignee: Design and Value Management Services Pty Ltd., Victoria (AU)

( * ) Notice: Subject to any disclaimer, the term of this patent is extended or adjusted under 35 U.S.C. 154(b) by 0 days.

(21) Appl. No.: 12/812,848

(22) PCT Filed: Jan. 15, 2009

(86) PCT No.: PCT/AU2009/000044
§ 371 (c)(1),
(2), (4) Date: Oct. 1, 2010

(87) PCT Pub. No.: WO2009/089584
PCT Pub. Date: Jul. 23, 2009

(65) Prior Publication Data
US 2011/0005144 A1    Jan. 13, 2011

(30) Foreign Application Priority Data

Jan. 15, 2008 (AU) ............................... 2008900192

(51) Int. Cl.
  *E04B 7/04* (2006.01)
  *E04B 7/16* (2006.01)
  *E04B 5/02* (2006.01)
  *G06Q 10/06* (2012.01)
  *E04B 7/24* (2006.01)
  *E04B 1/343* (2006.01)

(52) U.S. Cl.
  CPC ............... *E04B 1/34321* (2013.01); *E04B 5/02* (2013.01); *E04B 7/04* (2013.01); *G06Q 10/06* (2013.01); *E04B 7/24* (2013.01)

USPC ................... 52/92.2; 52/66; 52/79.5; 52/263; 52/279

(58) Field of Classification Search
  CPC ....... E04B 7/045; E04B 7/04; E04B 1/34321; E04B 1/3442; E04F 15/02452; E04D 2003/3615
  USPC ......... 52/645, 646, 66, 79.5, 90.1, 92.1, 92.2, 52/126.6, 263, 284, 585.1, 582.1, 270, 52/271, 58, 198, 279; 165/53, 170
  See application file for complete search history.

(56) References Cited

U.S. PATENT DOCUMENTS 1,633,820 A * 6/1927 Long et al. ..................... 5/119
2,055,339 A * 9/1936 Dalton .......................... 220/4.01

(Continued)

FOREIGN PATENT DOCUMENTS

DE  10134268 A1 * 1/2003  .............. B32B 31/04
DE  20211262 U1   1/2003

(Continued)

OTHER PUBLICATIONS

"Transitional settlement displaced populations", Tom Corsellis and Antonella Vitale, University of Cambridge shelterproject, University of Cambridge 2005, ISBN 0 85598 534 8 http://www.sheltercentre.org/library/transitional+settlement+displaced+populations Chapter 8 pp. 347-408, fig 8c-8o.

(Continued)

*Primary Examiner* — Brent W Herring
(74) *Attorney, Agent, or Firm* — Arent Fox LLP

(57) ABSTRACT

A process for providing emergency housing for a plurality of displaced people at a geographic location, said process including the steps of estimating the number of displaced people; determining a suitable combination of facilities to accommodate the displaced people; and transporting said facilities to said geographical location, wherein said suitable combination varies in accordance with the number of displaced people.

34 Claims, 21 Drawing Sheets

(56) References Cited

U.S. PATENT DOCUMENTS

| | | | | |
|---|---|---|---|---|
| 3,067,843 | A * | 12/1962 | Rushton | 52/126.6 |
| 3,150,748 | A * | 9/1964 | Liskey, Jr. | 52/396.04 |
| 3,246,689 | A * | 4/1966 | Remde et al. | 165/53 |
| 3,296,752 | A * | 1/1967 | Philp | 52/70 |
| 3,453,789 | A * | 7/1969 | Stephenson | 52/126.3 |
| 3,517,468 | A * | 6/1970 | Woods | 52/79.1 |
| 3,693,305 | A * | 9/1972 | Kneisel | 52/276 |
| 3,727,354 | A * | 4/1973 | Powell | 52/71 |
| 3,760,550 | A * | 9/1973 | Mueller et al. | 52/641 |
| 3,802,134 | A * | 4/1974 | McCorvey | 52/93.1 |
| 3,890,747 | A * | 6/1975 | Van Der Lely | 52/64 |
| 3,927,498 | A | 12/1975 | Bendetti | |
| 3,949,529 | A * | 4/1976 | Porter | 52/281 |
| 4,173,969 | A * | 11/1979 | Scholl | 126/706 |
| 4,188,758 | A * | 2/1980 | Swann | 52/241 |
| 4,288,951 | A * | 9/1981 | Carlson et al. | 52/94 |
| 4,319,520 | A * | 3/1982 | Lanting et al. | 454/290 |
| 4,327,532 | A * | 5/1982 | Matthews | 52/92.2 |
| 4,423,572 | A * | 1/1984 | Tor | 52/94 |
| 4,676,044 | A * | 6/1987 | Terenzoni | 52/745.14 |
| 4,689,925 | A * | 9/1987 | Granieri | 52/94 |
| 4,694,516 | A * | 9/1987 | Overman et al. | 5/93.1 |
| 4,724,646 | A * | 2/1988 | Meyers | 52/66 |
| 4,765,105 | A * | 8/1988 | Tissington et al. | 52/309.11 |
| 4,860,506 | A * | 8/1989 | Yoshimi et al. | 52/144 |
| 4,998,389 | A * | 3/1991 | Pritts | 52/90.1 |
| 5,159,792 | A * | 11/1992 | Pomento | 52/90.1 |
| 5,412,914 | A * | 5/1995 | Daw et al. | 52/126.6 |
| 5,427,571 | A * | 6/1995 | Sells | 454/365 |
| 5,461,832 | A * | 10/1995 | Smith | 52/69 |
| 5,483,776 | A * | 1/1996 | Poppe | 52/220.3 |
| 5,681,021 | A * | 10/1997 | Noll | 248/357 |
| 5,826,380 | A | 10/1998 | Wolfe | |
| 6,061,982 | A * | 5/2000 | Owen | 52/220.1 |
| 6,085,469 | A | 7/2000 | Wolfe | |
| 6,119,410 | A * | 9/2000 | Wolfe | 52/71 |
| 6,681,544 | B2 * | 1/2004 | Wall | 52/745.2 |
| 6,705,051 | B1 * | 3/2004 | Wall | 52/66 |
| 7,021,014 | B1 * | 4/2006 | Wolfe | 52/270 |
| 7,051,487 | B2 * | 5/2006 | Jones | 52/640 |
| 7,185,610 | B2 * | 3/2007 | Romeu Guardia | 119/448 |
| 7,299,595 | B1 * | 11/2007 | Anderson, Sr. | 52/506.05 |
| 7,832,159 | B1 * | 11/2010 | Kayhart | 52/220.3 |
| 7,918,059 | B2 * | 4/2011 | Repasky | 52/263 |
| 2001/0023563 | A1 * | 9/2001 | Phillips | 52/292 |
| 2003/0051420 | A1 | 3/2003 | Leon | |
| 2003/0056446 | A1 * | 3/2003 | Napier | 52/66 |
| 2007/0204539 | A1 | 9/2007 | Owen | |
| 2010/0275528 | A1 * | 11/2010 | Andrews | 52/126.6 |
| 2010/0300015 | A1 * | 12/2010 | Wang et al. | 52/126.6 |
| 2011/0011012 | A1 * | 1/2011 | Knight et al. | 52/126.6 |
| 2011/0143324 | A1 * | 6/2011 | Paganini | 434/226 |

FOREIGN PATENT DOCUMENTS

| | | | | |
|---|---|---|---|---|
| DE | 202005016434 | U1 | 4/2006 | |
| FR | 2712013 | A | 5/1995 | |
| JP | 03206271 | A * | 9/1991 | E04H 15/20 |
| WO | WO 2009094776 | A1 * | 8/2009 | |

OTHER PUBLICATIONS

"Emergency Housing Systems from Thre-Dimensional Engineered Fiberboard" Jerrold E. Winandy, John F. Hunt, Christopher Turk, James R. Anderson, United States Department of Agriculture Forest Service Forest Products Laboratory General Technical Report FPL-GTR-166 Apr. 2006 <http://www.fpl.fs.fed.us/documents/fplgtr/fpl_gtr166.pdf>.

* cited by examiner

PROCESS FOR PROVIDING EMERGENCY HOUSING FOR A PLURALITY OF DISPLACED PEOPLE

CROSS REFERENCE TO RELATED APPLICATION

This application is a National Stage entry of International Application No, PCT/AU2009/000044, filed Jan. 15, 2009, which claims priority to Australian Patent Application No. 2008900192, filed Jan. 15, 2008. The disclosure of the prior application is hereby incorporated in its entirety by reference.

TECHNICAL FIELD OF THE INVENTION

The present invention relates to a process for providing emergency housing for a plurality of displaced people at a geographic location; a dwelling for emergency housing displaced people; a base support structure for a dwelling; a roof structure for a dwelling; and a bladder for a base support structure of a dwelling.

BACKGROUND OF THE INVENTION

Millions of people become displaced each year by natural disasters, such as floods, and internal disasters such as wars. These sorts of disasters have a tendency to displace large numbers of people in a very short time frame. People can be displaced for months, years and in some cases even generations. For example, the length of time that people are displaced by natural disasters in developed countries is typically between 4 and 12 months, whereas in third world countries, they are typically displaced between 3 and 5 years.

Previously, aid organisations, such as the Red Cross™, have provided temporary accommodation for people displaced by the disaster. However, existing solutions typically provide short term fixes to long term problems. Temporary accommodation has a number of associated problems. These problems are largely directed to the terrain, location and the climate in which the disaster occurred. Temporary accommodation has previously been established by way of providing canvas tents, for example, to displaced people. Notwithstanding that the tents may offer some protection from the elements, they may not provide the requisite security for the vulnerable members of the community. For example, there is a high incidence of rape of women and theft from the elderly. Given these considerations, it is generally desirable to provide temporary but secure housing for people displaced by a natural disaster, for example.

Other issues facing displaced people are that the community structure breaks down and little focus is given to rebuilding it. People are 100 percent reliant on government aid and other people's goodwill and food provisions. There is a continual reliance on first line support for basic shelter, clean water and basic food provisions. Temporary housing solutions, including tents and makeshift dwellings, need continual maintenance and replacement. Due to the high concentration of people, there is typically a high incidence of disease and lack of hygiene. People lack the opportunity to become part of their own solution. There is generally an inability to adequately care for the vulnerable.

It is generally desirable to overcome or ameliorate one or more of the above mentioned difficulties, or at least provide a useful alternative.

SUMMARY OF THE INVENTION

In accordance with one aspect of the invention, there is provided a process for providing emergency housing for a plurality of displaced people at a geographic location, said process including the steps of:
(a) estimating the number of displaced people;
(b) determining a suitable combination of facilities to accommodate the displaced people; and
(c) transporting said facilities to said geographical location, wherein said suitable combination varies in accordance with the number of displaced people.

Preferably the process includes the step of erecting said facilities at said location.

In accordance with another aspect of the invention, there is provided a dwelling for emergency housing for displaced people, including:
(a) a base structure;
(b) a plurality of walls coupled to the base structure; and
(c) a roof structure coupled to the walls.

Preferably, the base support structure includes:
(i) a plurality of base support panels coupled together by fasteners;
(ii) a plurality of base support jacks for supporting the base support members over a floor or ground surface;
(iii) a plurality of edge supports that define a raised perimeter around the base support panels;
(iv) a plurality of floor supports coupled to and extending upwardly from a planar surface of the base support panels; and
(v) a plurality of floor panels coupled to the edge supports and the supports.

Preferably, the roof structure including one or more roof panels; and a ridge member, wherein the roof panels are rotatably couplable to the ridge member and slidably couplable to the walls so that the roof panels rotate with respect to the ridge member and translate with respect to the walls in accordance with changes in pitch of the roof structure.

In accordance with another aspect of the invention, there is provided a kit for a dwelling, including the components of the above described dwelling.

In accordance with another aspect of the invention, there is provided a base support structure for a dwelling, including:
(a) a plurality of base support panels coupled together by fasteners;
(b) a plurality of base support jacks for supporting the base support members over a floor or ground surface;
(c) a plurality of edge supports that define a raised perimeter around the base support panels;
(d) a plurality of floor supports coupled to and extending upwardly from a planar surface of the base support panels; and
(e) a plurality of floor panels coupled to the edge supports and the supports.

In accordance with another aspect of the invention, there is provided a roof structure for a dwelling having a plurality of walls extending upwardly from a base structure, including:
(a) one or more roof panels; and
(b) a ridge member,
wherein the roof panels are rotatably couplable to the ridge member and slidably couplable to the walls so that the roof panels rotate with respect to the ridge member and translate with respect to the walls in accordance with changes in pitch of the roof structure.

In accordance with another aspect of the invention, there is provided a bladder for a base support structure of a dwelling, including a plurality of apertures extending therethrough, the apertures being shaped to receive respective ones of floor support structures extending through the bladder.

Advantageously, preferred embodiments of the invention offer displaced persons dignity in dealing with the crisis that they confront.

Advantageously, preferred embodiments of the invention are adapted for use in almost any location, terrain, and climate.

Advantageously, preferred embodiments of the invention minimise the time period, cost, efforts and implications of long term and basic human survival needs.

Advantageously, preferred embodiments of the invention minimise the time period, cost, efforts from basic human survival to real recovery efforts.

BRIEF DESCRIPTION OF THE DRAWINGS

Preferred embodiments of the present invention are hereafter described, by way of non-limiting example only, with reference to the accompanying drawing in which.

DETAILED DESCRIPTION OF PREFERRED EMBODIMENTS OF THE INVENTION

Figure 1:
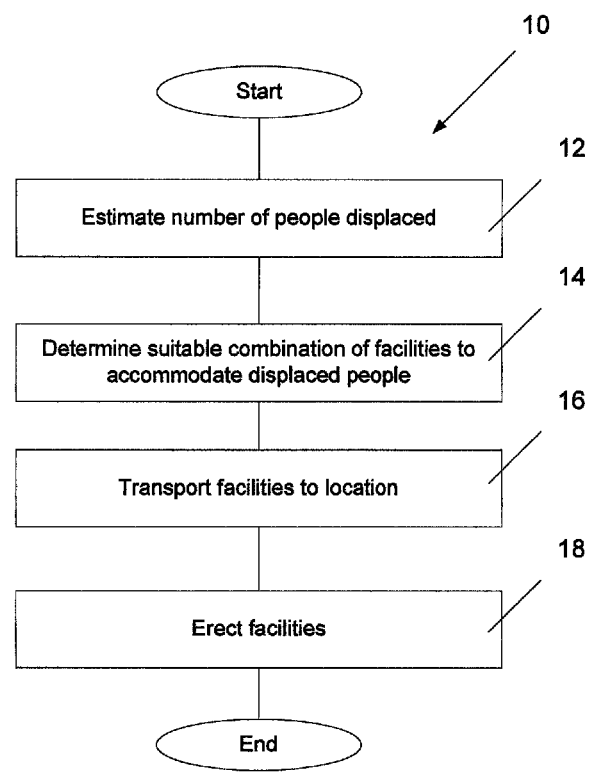
FIG. 1 is a flow chard showing a process for providing emergency housing for a plurality of displaced people at a geographic location.

A process 10 for providing emergency housing for a plurality of displaced people at a geographic location is shown in FIG. 1. The process 10 is hereafter described, by way of non-limiting example, with reference to providing emergency housing to people displaced as a result of a natural disaster. However, the process 10 is equally applicable to housing for remote location sites; workers' accommodation; refugees' huts in national parks; bush fire fire-fighter's camps, etc.

The process 10 includes the steps of estimating 12 the number of people displaced; determining 14 a suitable combination of facilities to accommodate the displaced people; and transporting 16 the facilities to the geographic location. The suitable combination varies in accordance with the number of displaced people. The process 10 also includes the step of erecting 18 the facilities at said location.

The step of transporting 16 includes the step of mobilising a plurality of shipping containers containing the above mentioned suitable combination of facilities. The suitable combination of facilities preferably includes a plurality of dwellings, each being suitable for housing a plurality of people, and community halls, for example.

Figure 2:
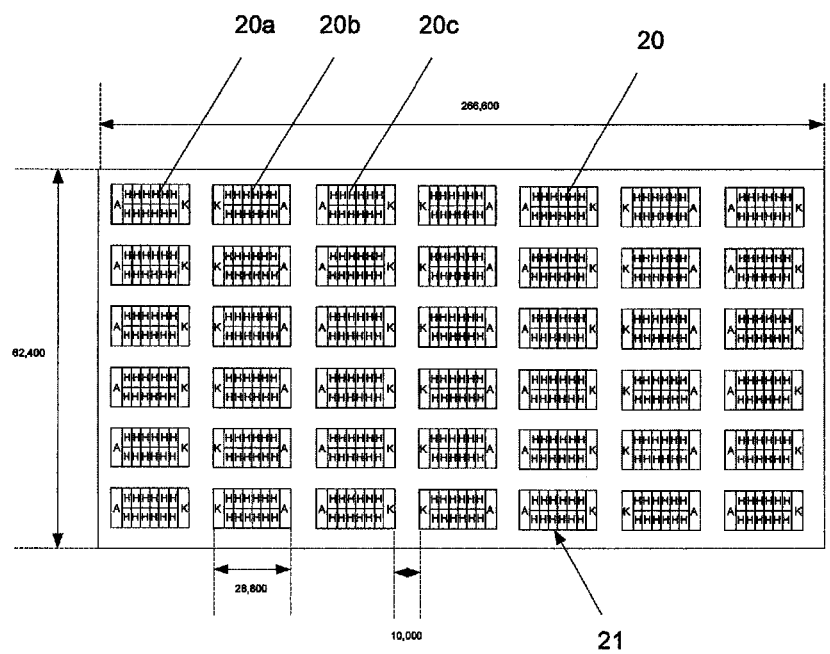
FIG. 2 is a diagrammatic illustration of an array of clusters.

The dwellings 20 shown in FIG. 2, hereafter referred to as clusters 20, each include a plurality of housing units (identified as item "H" in FIG. 2), connected to a kitchen unit (identified as item "k" in FIG. 2), and an amenities unit (identified as item "A" in FIG. 2). The dimensions of the units are preferably as follows:

a. Housing units 3600 mm by 2700 mm;
b. Kitchen unit 3600 mm by 5400 mm; and
c. Amenities unit is preferably 3600 mm by 5400 mm.

Each housing unit can preferably sleep up to seven people and each cluster can preferably sleep up to 84 people, for example.

The clusters 20 are arranged in the grid 21 shown in FIG. 2 whereby neighbouring clusters 20a, 20b, 20c have opposed kitchen units, and opposed amenities units. The clusters are separated by sufficient space to facilitate easy delivery of food, water, fuel, gas etc to adjacent kitchen units; and toiletry supplies, etc to adjacent amenities units. The grid 21 of clusters 20 allows for efficient set-up, servicing, access, security and dismantling. The grid 21 substantially reduces the effort of on going servicing.

Kitchen units preferably include:
a. Secure food stores;
b. Generator and generator fuel;
c. Gas supplies; and
d. Cooking utensils, ovens, fridges, other cool storage facilities.

Amenities units typically include:
a. Toilets;
b. Shower and cleaning facilities;
c. Associated supplies; and
d. Secure storage of hard waste.

The grid 21 of clusters 20 shown in FIG. 2 assists in the establishment of a community.

In the event of a natural disaster where emergency housing is needed for a large number of people.

The following predetermined levels of response are involved in the step of determining, at step 14, the suitable combination of facilities to accommodate the displaced people:
- a. Level 1—Immediate shelter; clean water; basic first aid; and food.
- b. Level 2—Provide temporary cluster accommodation.
- c. Level 3—Build in medium to long term community infrastructure.

A level 1 response is short term and immediate response. The container's are prepackaged and ready to deploy. A level 1 response is set aside from preferred location of level 2 and 3 responses. This allows for processing of persons and health checks, etc, prior to going to level 2 accommodation as well as minimising disruption of the erection of level 2 and 3 infrastructure. A level 1 container includes basic items such:
- a. Shelter;
- b. Water catchment and storage;
- c. Communications;
- d. Basic food stuffs; and
- e. Documentation to record information on both victims and survivors.

A level 2 response replaces the level 1 response. This level of response include the provision of secure accommodation, such as the clusters described below in further detail. When setting out level 2, allowance for level 3 infrastructure may be needed depending on location and level of needs. The layout itself substantially reduces the effort of on going servicing. Improves food, fuel, and water deliveries as these can be carried out on either side in accordance with symmetric lay out. Similarly, there is improved removal of hand waste and effluent.

A level 3 response includes the provision of community infrastructure such as school, hospitals, secure refugees, places of worship, community halls, etc.

A strength of the process 10 is that each cluster 20 has ownership of its own commodities and are secure. The more vulnerable sections of the community (that is, the women, the children, and the elderly) can be brought together and protected as a whole. Health care and first aid can be evaluated quickly and systematically promoting high rates of immunisation to combat a potential increase in disease. Civil obedience and is advantageously quickly re-established allowing a re-activation of commerce and civil obedience. The displaced persons become a resource to assist in the cleanup and recovery from the event. Advantageously, this injects currency to the most needy. With the reduction of the urgency of the situation, disaster recovery planners are free to tackle longer term goals rather than knee jerk reactions to immediate needs. Advantageously, this allows maximum benefit to be gained by communities and the relevant country from the aid currently expended.

The above mentioned facilities are preferably packaged in shipping containers for transport to the geographic location. Each level 1 container has a specific colour. For example, the level 1 containers are preferably coloured red reflecting the urgency of their deployment. Each level 2 container has a number and is labelled A, B, or C, indicating the order in which a set of commonly numbered containers should be opened. The level 2 containers preferably have a neutral colour, such as brown. Each level 3 container has a number and is labelled A, B, C, D, E, F, G, H, I, J, . . . indicating the order in which a set of commonly numbered containers should be opened. The level 3 containers preferably have a neutral colour, such as blue.

All containers preferably have global positioning signal tracking systems fitted to them and bar codes to permit easy identification. Once the containers have been emptied, they can be used as secure storage units, or temporary shelters, for example.

Steps Taken to Effect Recovery from Disaster Displacement:
- b. Receive order UN/Red Cross/Government, including location of disaster; and level of disaster.
- c. Mobilise central and/or regional stockpiles clusters and transfer them to a transport hub.
- d. Print out assembly instructions in the main language of the displaced people.
- e. Transport cluster containers to disaster location.
  - i. Level 1—the containers are flown to the disaster site within 12 to 48 hours.
  - ii. Levels 2 to 3—the containers are shipped to disaster location within 7 to 10 days. Then the containers are moved from the port to the disaster location by road and/or rail. Typically three clusters can be erected within 48 hours of arriving by ship.
- f. Level out the site as much as possible. Preferably locate level 2 and 3 sites on the flattest terrain.

Steps Taken to Arrange Housing:
- a. Select the site of level 1 container deployment away from main level 2 and 3 proposed erection areas to allow for transient movement from level 1 shelter to level 2 shelter.
- b. Evaluate community needs and usable existing infrastructure.
- c. Evaluate position of effected and accommodate spaces within the level 2 response for the level 3 community requirements. That is, shops, hospitals, schools, halls, and places of worship, etc
- d. Set out level 2 response containers to ground where containers are located in main road access area. Each group of up to three containers is arranged side by side. This allows for easy removal after erection of clusters. Remove containers to storage area on outskirts of the community.
- e. Set out level 3 response containers to ground where containers are located in main road access area. Each group of containers is arranged side by side. This allows for easy removal after erection of clusters. Remove containers to storage area on outskirts of the community.

A first group of local people work with the trained crew to assemble the first cluster. The trained crew then work with a second group of local people to construct the next cluster and the first group of local people work with a third group of local people to construct a third cluster. This process continues until construction is complete. In doing so, the clusters are constructed at an ever increasing rate.

The clusters 20 are adapted to be readily disassembled and packed back into the shipping containers for use in another location.

Figure 3:
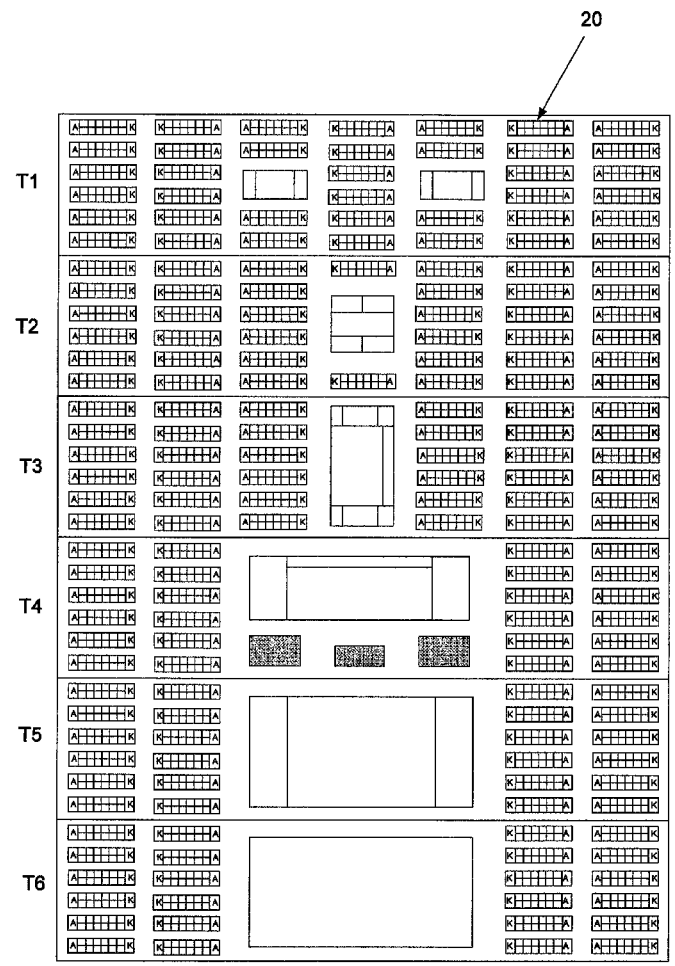
FIG. 3 is a diagrammatic illustration of another array of clusters.

The arrangement of clusters 20 shown in FIG. 3 shows an incremental increase in needs from T1 to T6. In a given community, as the number of displaced persons increases the infrastructure expectation increases as follows:
- a. For up to 10,000 people, only T1 unit is needed;
- b. For each 25,000 people, 1×T2 unit will be provided;
- c. For each 50,000 people, 1×T3 unit will be provided;
- d. For each 100,000 people, 1×T4 unit and 1×T5 unit will be provided; and
- e. For each 250,000 people, 1×T6 unit will be provided.

Based on the above information, 1.5 million people will require 6 T6's; 15×T4 or 15×T5; 30×Ts; and 60×T2 with 446.56×T1.

Construction of Housing Unit for a Cluster

Figure 4:
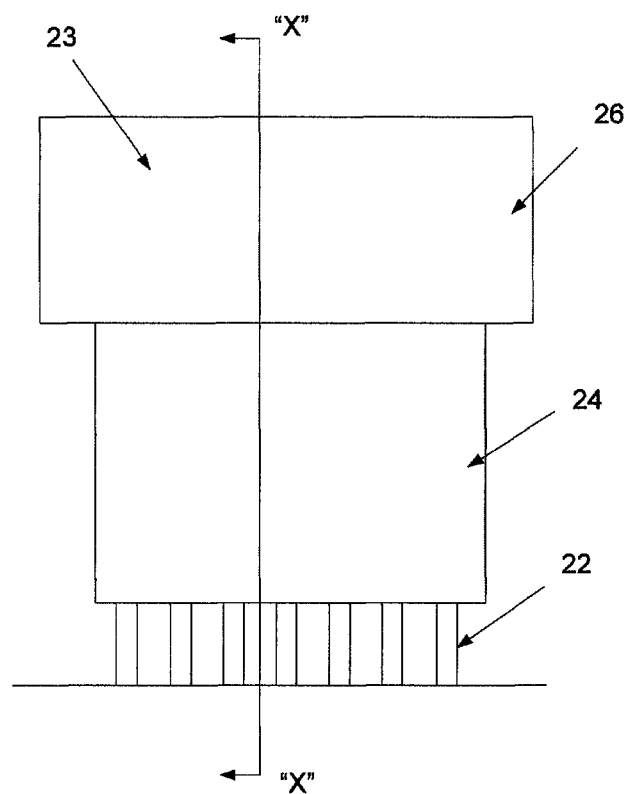
FIG. 4 is a diagrammatic illustration of a dwelling.

In the example shown in FIG. 2, each cluster 20 includes 12 housing units coupled together. A detailed description of the components of the housing unit 23 shown in FIG. 4 is set out below with reference to the base structure 22; the walls, ceiling and exoskeleton 24; the roof Structure 26; and Services & fittings.

1. Base Structure

Figure 5:
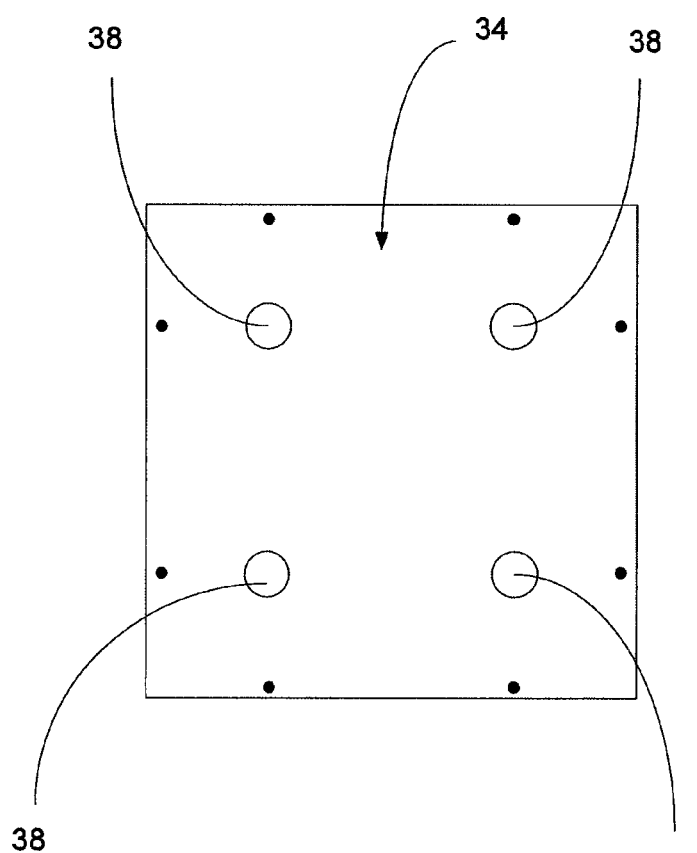
FIG. 5 is a diagrammatic illustration of a bottom view of base support panel.
Figure 6:
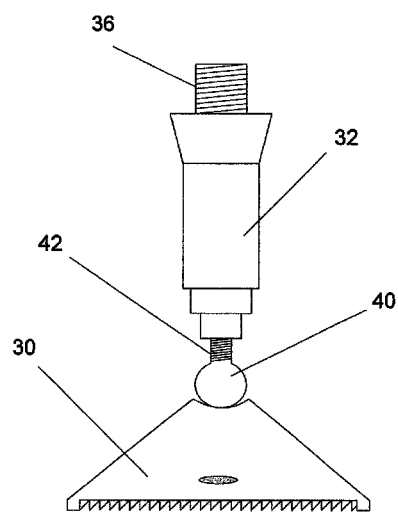
FIG. 6 is a diagrammatic illustration of a front view of a base jack coupled to a sole plate.
Figure 7:
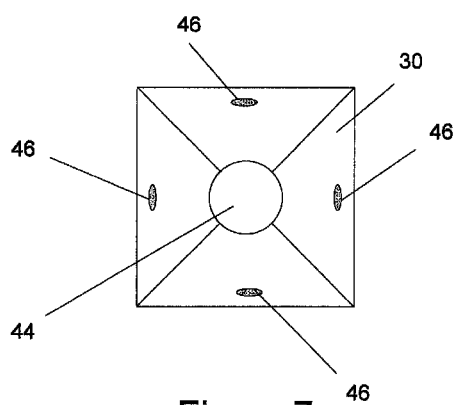
FIG. 7 is a diagrammatic illustration of a plan view of a sole plate.

The level 2 container is opened. The contents of the container are loaded in a last, in first out procedure. Initially, the following items, shown in FIGS. 5 to 7, are removed:
 a. Sole plates 30;
 b. Base Jacks 32; and
 c. base support panels 34.

The base support panel 34 is arranged in the manner shown in FIG. 5, so that its under side is facing upwards towards the sky. When so arranged, the screw threads 36 of the base jacks 32 are coupled to corresponding threaded recesses 38 of the base support panel 34.

As shown in FIG. 6, the base jacks 32 are multi stage jacks 32 with ratchet adjustment. They each include a screw thread 36 at one end for connection to corresponding screw threads 38 of the base support panel 34. The jacks 32 also include a knuckle 40 coupled to an opposite end by way of an additional screw thread 42. The screw thread 42 permits final stage adjustment to allow precise level levelling. Knuckle end 40 allows for connection to sole plate 30 to accommodate for undulations in the terrain.

The jack 32 is tapered at the base to distribute weight and to provide lateral stability. The jack 32 also has raised areas to assist hand installation/hand tightening.

Selected sole plates 30 are then fitted to the knuckled ends 40 of the jacks 32. As particularly shown in FIG. 7, the sole plate includes a recess 44 shaped for mating with the knuckled end section 40 of the base jack 32. The plate 30 includes a plurality of apertures 46 so that it can be pegged down. The underside of the plate 30 is textured to increase its purchase on the terrain. The plates 30 are interchangeable to suit terrain and weight distribution. For example, to suit schools, halls and heavy point loads.

$$300 \times 300 \Rightarrow \frac{0.09 * 4}{0.81} = 44.44\%$$

$$250 \times 250 \Rightarrow \frac{0.0625 * 4}{0.81} = 30.86\%$$

$$350 \times 350 \Rightarrow \frac{0.1225 * 4}{0.81} = 60.49\%$$

When terrain is less than 10 degrees slope, typical cluster 20 sole plates 30 would be 250 mm². That is, less than 30 percent weight distribution Allow maximum of 900 mm adjustable over 2.70 m width for a 18.43 degree slope.

The base support panel 34 is then flipped over so that the base jacks 32 and sole plates 30 support the panel 34 over the ground surface. Fine adjustment of the jacks 32 can then be made so that the panel is generally level on the ground surface. The base structure can be laser leveled and the base jacks adjusted to best fit the ground surface. Each base support panel is designed to advantageously support 500 kilograms per square meter.

The above described steps are repeated for each one of the base plates 34 in the container until the floor plan is completed and the base plates 34 form a level base structure 22.

Figure 8:
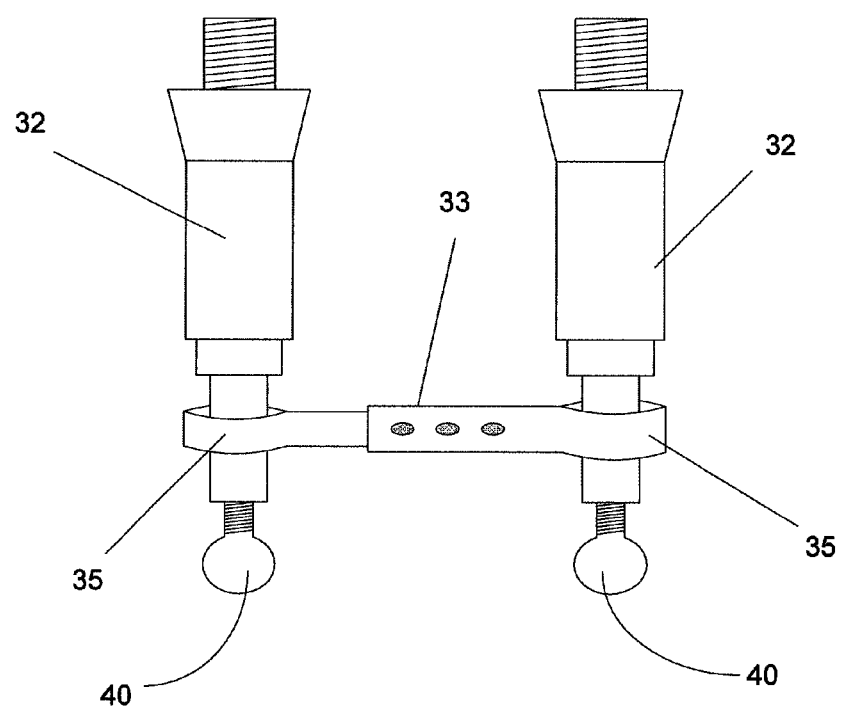
FIG. 8 is a diagrammatic illustration of a front view of a bracing system.

If the slope of the terrain exceeds 20 degrees, it may be necessary to brace the base jacks 32 together in the manner shown in FIG. 8. The brace 33 includes two annular loops 35 shaped to fit around the waist of opposed jacks. The brace has lock down ends with a self tightening band.

Figure 9:
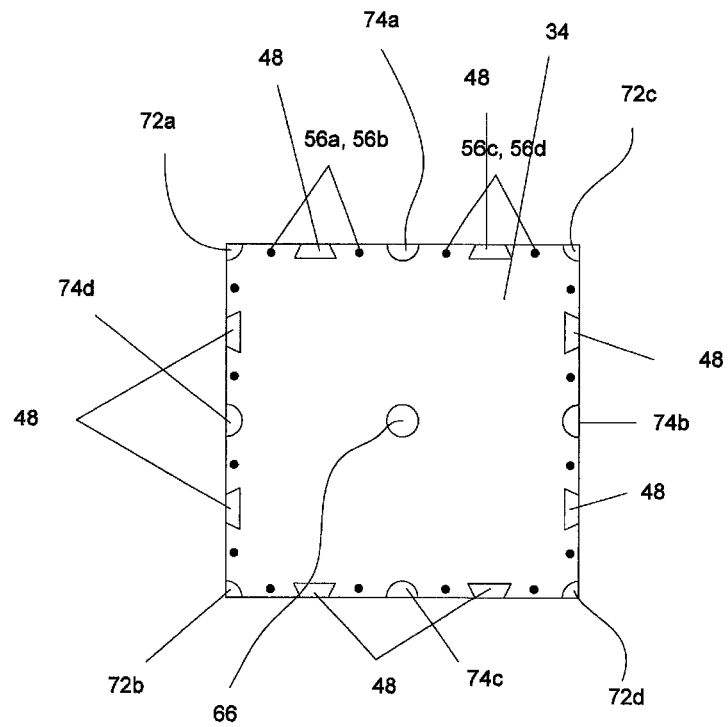
FIG. 9 is a diagrammatic illustration of another top view of the base support panel shown in FIG. 5.
Figure 10:
FIG. 10 is a diagrammatic illustration of a plan view of a bowtie connector.

As particularly shown in FIG. 9, the upper side of each base plate 34 includes a plurality recesses 48 shaped to receive half of an interlocking bowtie connector 50 of the type shown in FIG. 10.

Figure 11:
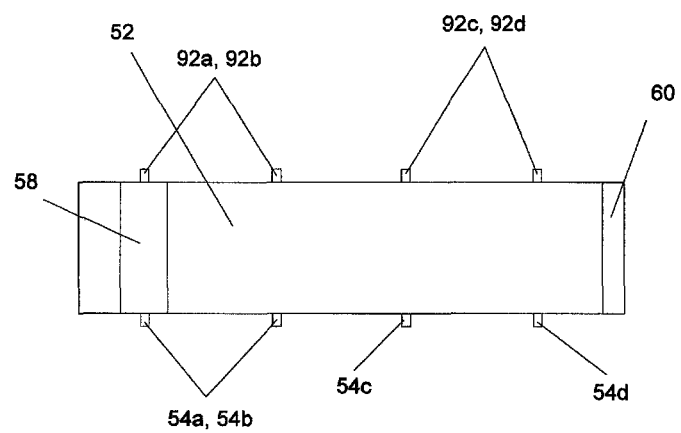
FIG. 11 is a diagrammatic illustration of a side view of an edge support.
Figure 12:
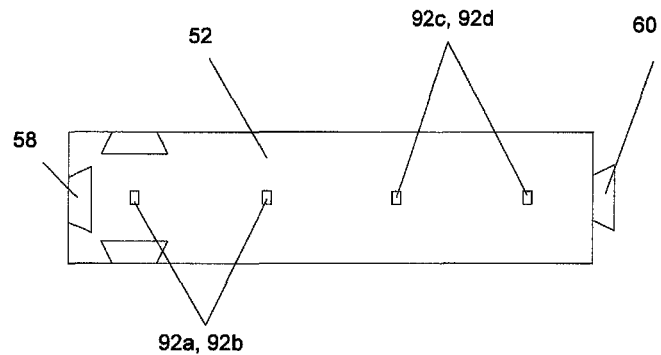
FIG. 12 is a diagrammatic illustration of a top view of the edge support shown in FIG. 11.

The edge supports 52 shown in FIGS. 11 and 12 are taken from the container and fitted to the upper side of the base plates 34 to form a wall around the perimeter of the base structure 22. Each support 52 includes four lugs 54a, 54b, 54c, 54d extending in a common direction from a common side of the support 52. The lugs are arranged to be seated in corresponding recesses 56a, 56b, 56c, 56d formed in the edge of the base plates 34. The edge supports 52 are thereby coupled to the base plates 34. The lugs 54a, 54b, 54c, 54d are, for example, spaced 225 mm apart, the first starting 112.50 mm from the left hand side. The edge supports 52 are preferably 900 mm long; 25 mm wide; and of a height to suit the needs of the capacity of the bladder (described in further below).

A first end of each edge support 52 includes a bowtie recess 58 for connection with a bowtie connector. A second end, opposite the first end, of each edge support 52 includes half of a bowtie connector 60 extending outwardly therefrom. As such, each edge support 52 is coupled to its neighbouring edge supports 52 by way of bowtie connectors 60 and corresponding bowtie recesses 58.

Figure 13:
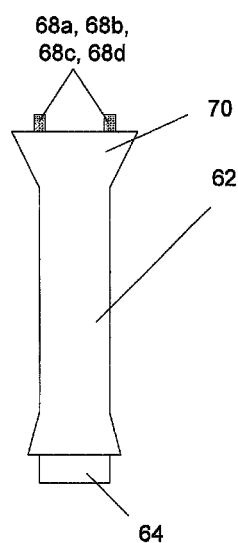
FIG. 13 is a diagrammatic illustration of a front view of an upstand support.
Figure 14:
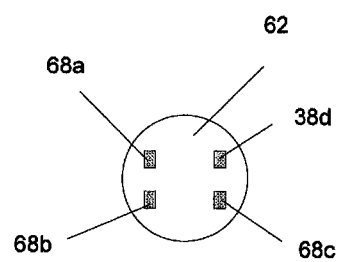
FIG. 14 is a diagrammatic illustration of a top view of the upstand support shown in FIG. 13.

The upstand supports 62 shown in FIGS. 13 and 14 are taken from the container. Stemmed sections 64 of the upstand supports 62 are seated in corresponding recessed sections 66 of the upper sides of the base plates 34. Upper ends of the upstand supports 62 include four lugs 68a, 68b, 68c, 68d for connection to the floor panels (described below). The upper ends 70 of the supports 62 are tapered to increase floor support area. The height of the upstand supports 62 corresponds to that of the corresponding edge supports.

As mentioned, each base plate 34 includes a centrally disposed upstand recess 66. Each base 34 plate also includes quarter upstand recesses 72a, 72b, 72c, 72d located in each corner so that four adjoining base plates 34 form a complete upstand recess. Each base plate additionally includes half upstand recesses 74a, 74b, 74c, 74d located in at mid points along each edge so that each adjoining base plate 34 forms a complete upstand recess. The result is that an upstand support 70 is located approximately every 450 mm across the upper side of the base structure 22.

Figure 15:
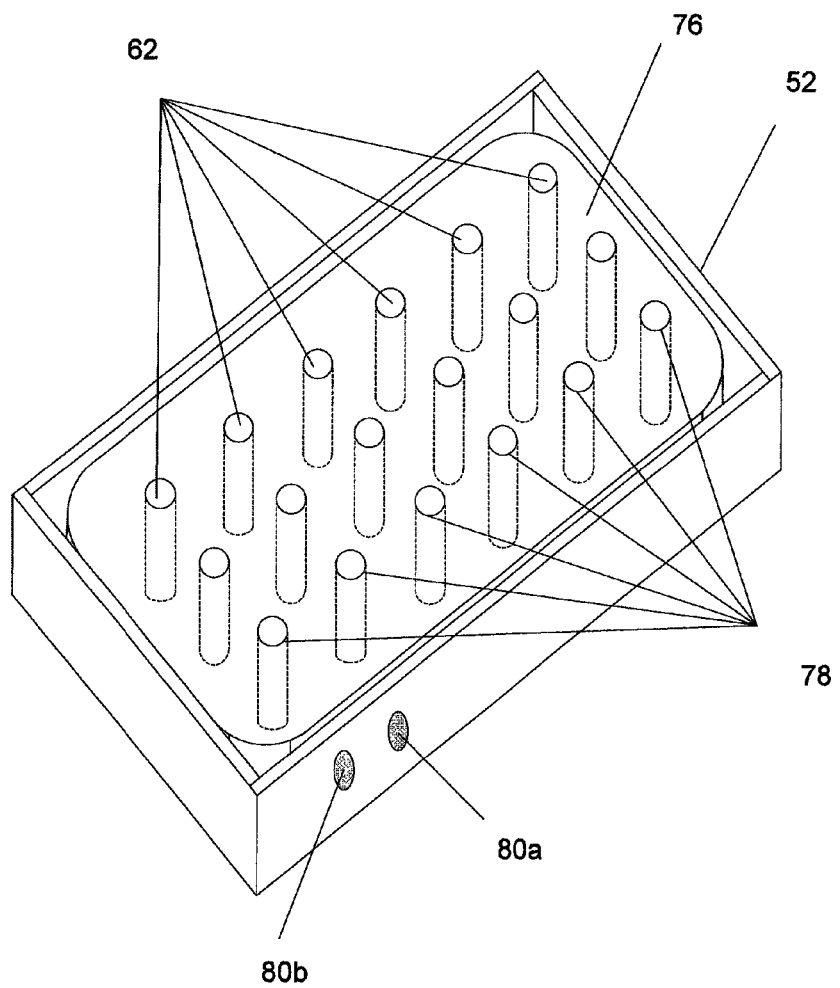
FIG. 15 is a diagrammatic illustration of a perspective view of a base support structure.

The bladder 76 shown in FIG. 15 is then taken from the container and seated within the perimeter walls defined by the edge supports 52 of the base structure 22. The bladder 76 includes a plurality of apertures 78 shaped to receive respective ones of the upstand supports 70 so that they extend from respective the base plates 34 through the bladder 76. The bladder 76 includes inlet and outlet ports 80a, 80b which are aligned with corresponding apertures in the edge supports 52 so that they are accessible from outside the base structure 22. The ports 80a, 80b have suitable taps/valves (not shown) to draw/insert fluids from/into the bladder 76.

The bladder 76 is preferably made of a leak resilient material. The bladder 76 preferably provides an insulative layer for the accommodation. The bladder 76 acts as an insulation layer to the floor as well as a heat bank in cold climates or a refrigeration bank in hot climates. The bladder 76 is preferably rectangular in cross-section when filled. The bladder 76 is preferably walled and National Sanitation Foundation certified.

In an alternative embodiment, the bladder 76 is designed for use under any substructure. For example, the bladder 76 can be used under the floor of a typical house. In this embodiment, the bladder 76 is shaped to fit in and around traditional house support structure such as stumps and other services. The benefits in doing so include space utilisation and minimal temperate changes. The apertures 78 are cylindrical, or any other suitable shape to, to receive stumps and other services.

Silver technology is preferably utilised to minimise bacteria and bio-film growth in fresh and recycled water. The bladder 76 includes a four stage filtration system including sediment, chemical, bacteria and taste.

A plunger pump line (not shown) for drawing water, for example, from the bladder 76 is coupled to the outlet of the bladder 76. Alternatively, the base support structure 22 includes two bladders (not shown). The first bladder is intended to store fresh drinking water and the second bladder is used to collect effluent and other waste fluids.

Figure 16:
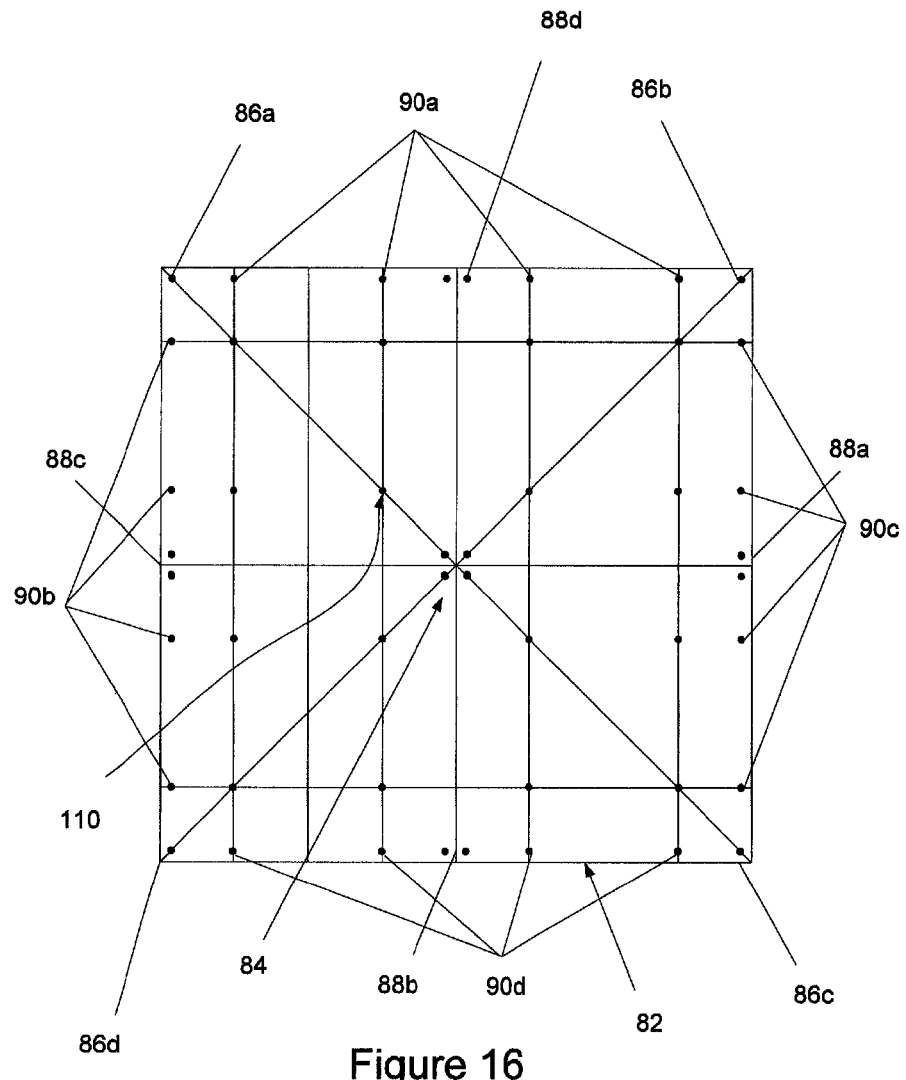
FIG. 16 is a diagrammatic illustration of a top view of a floor panel.

The floor panels 82 shown in FIG. 16 are then taken from the container and fitted to the base structure. Each the floor panel 82 includes four centrally disposed apertures 84 for engagement with corresponding lugs 68a, 68b, 68c, 68d extending from an upper section 70 of an upstand support 62. Each floor panel 82 also includes an aperture 86a, 86b, 86c, 86d in each corner, so that four adjoining floor panels 82 can be coupled to the lugs 68a, 68b, 68c, 68d of a common upstand support 62. Each floor panel 82 additionally includes half upstand apertures 88a, 88b, 88c, 88d located in at mid points along each edge so that each adjoining floor panel 82 can be coupled to the lugs 68a, 68b, 68c, 68d of a common upstand support 62. The result is that an upstand support is located approximately every 450 mm across the bottom side of the floor.

Peripheral apertures 90a, 90b, 90c, 90d of the floor panels 82 located on the edge of the floor plan of the base structure 22 are coupled to lugs 92a, 92b, 92c, 92d as shown in FIG. 11, on the upper side of the edge supports 52. The apertures 90a, 90b, 90c, 90d are preferably spaced apart 225 mm, starting 112.5 mm from each corner. This corresponds to the location of the lugs 92a, 92b, 92c, 92d of the edge supports 52.

The floor panels 82 are preferably 899 mm by 899 mm, slightly smaller than the base plates (900 mm by 900 mm). This advantageously permits easier placement of the floor panels 82.

Any relevant services, such as water and sewage, can then be brought through the floor.

Figure 17:
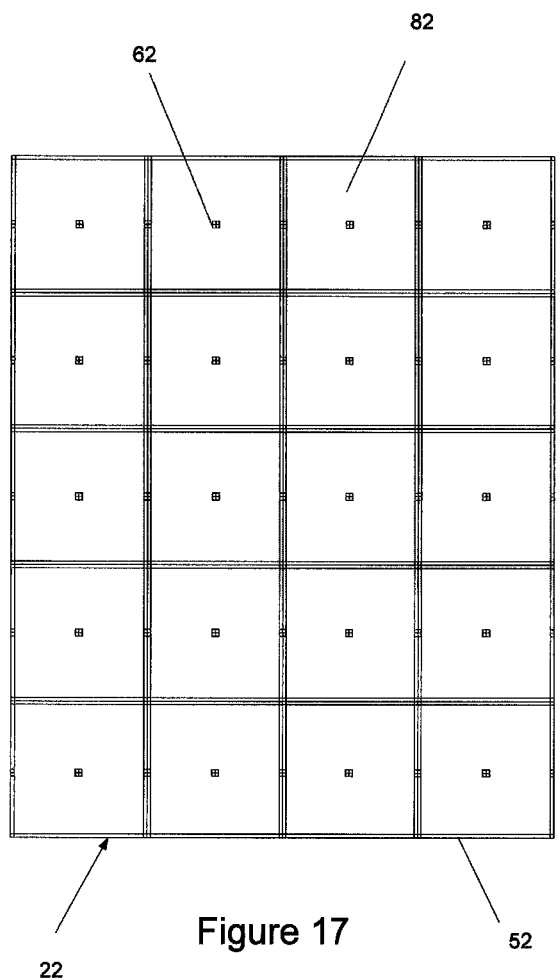
FIG. 17 is a diagrammatic illustration of a plan view of the base support structure shown in FIG. 15 including floor panels.

The result of performing the above described steps is the base structure shown in FIG. 17 that has a trafficable floor with a water ballast/storage bladder.

2. Walls, Ceiling and Exoskeleton a. Walls

Figure 18:
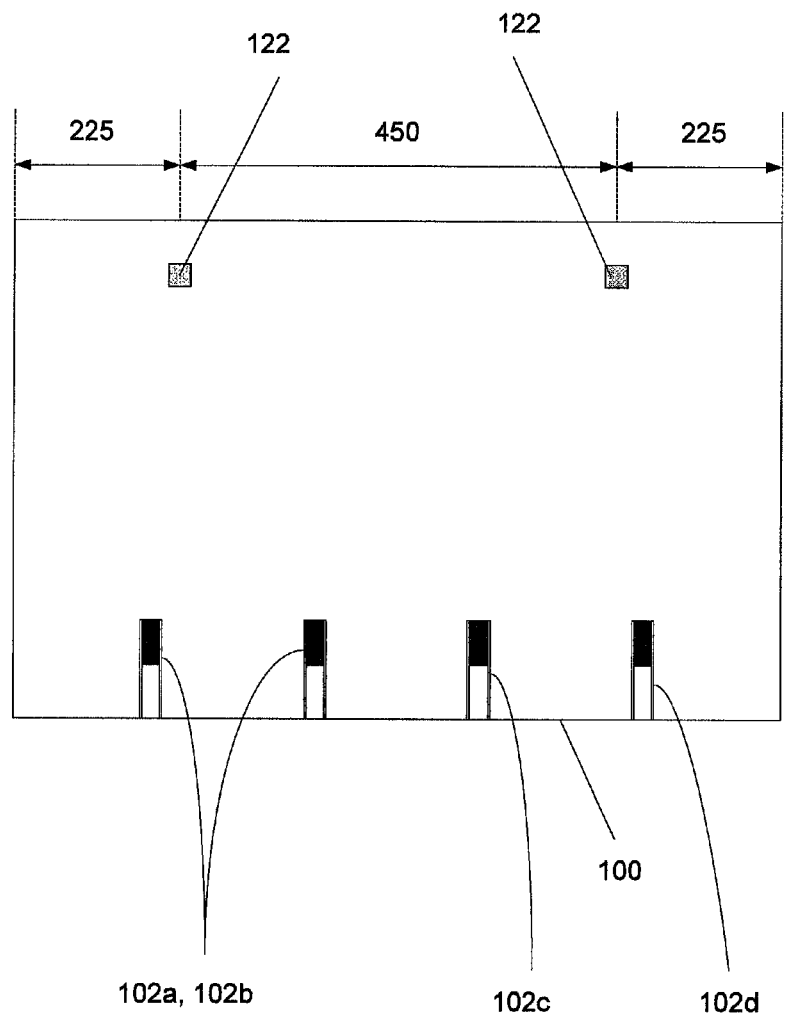
FIG. 18 is a diagrammatic illustration of a side view of a wall panel.

The wall panel 100 shown in FIG. 18 is taken from the container and carried onto the floor of the base structure 22. The wall panel 100 is preferably 900 mm in length, for example. The height of the wall panel 100 is adjusted to suit the likely usage of the accommodation. The wall panel 100 includes four compression locating pins 102a, 102b, 102c, 102d located in spaced apart positions along the foot of the wall panel 100. The first pin 102a in the series is located 112.50 mm from the edge of the wall panel 100 and each successive pin is located 250 mm apart.

Figure 19:
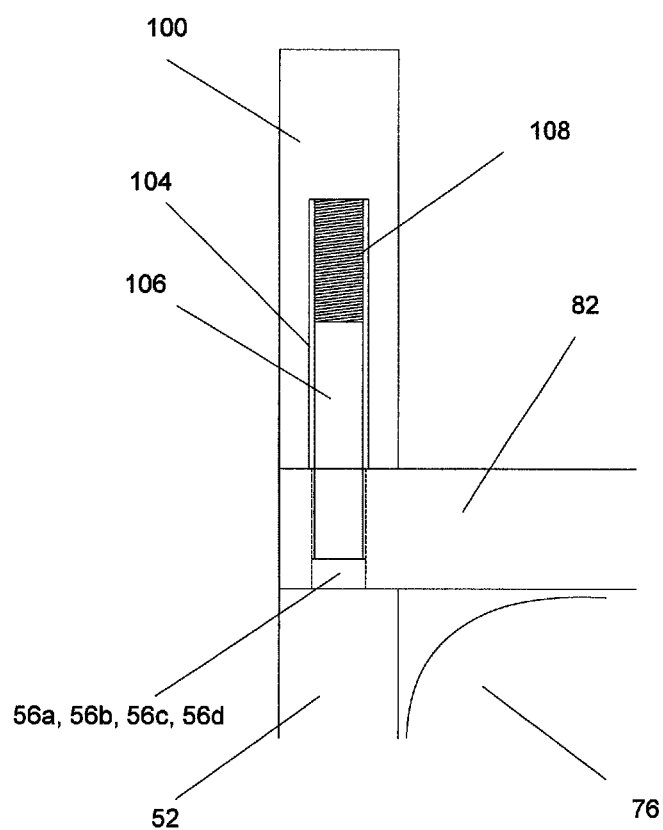
FIG. 19 is a diagrammatic illustration of a cross-section view of the wall panel shown in FIG. 18 coupled to the base support structure shown in FIG. 17.

As particularly shown in FIG. 19, each compression spring 102a, 102b, 102c, 102d includes a pin cavity 104, a locating pin 106; and a spring 108.

The wall panels 100 are positioned such that the pins 102a, 102b, 102c, 102d are located over corresponding recesses 90a, 90b, 90c, 90d in the floor panels 82. The pins 102a, 102b, 102c, 102d expand from the compressed condition shown in FIG. 18 to the expanded condition shown in FIG. 19 when they are positioned over the pin recesses 90a, 90b, 90c, 90d in the floor panels 82. The internal walls 100 are preferably erected first, followed by the external walls 100.

As particularly shown in FIG. 16, the floor panels 82 include a plurality of apertures 110. As such, the possibility exists to design a floor plan to suit the needs of many different applications. For example, large rooms can be created for schools. Alternatively, a plurality of bed rooms can be created, for example.

During transit, or at any stage before erection of the cluster 20, the compression locating pins 102a, 102b, 102c, 102d are preferably seated within the pin cavity 104 with the spring 108 in a compressed condition of use. The pins 106 are held in position by plastic inserts.

Where internal walls 100 require structural location/attachment to the floor panel, plastic inserts are used to create boltable connection to the floor.

The wall panels 100 preferably include doors and windows (not shown). The wall panels 100 preferably have a sandwich panel construction. Alternatively, any suitable material could be used.

Figure 20:
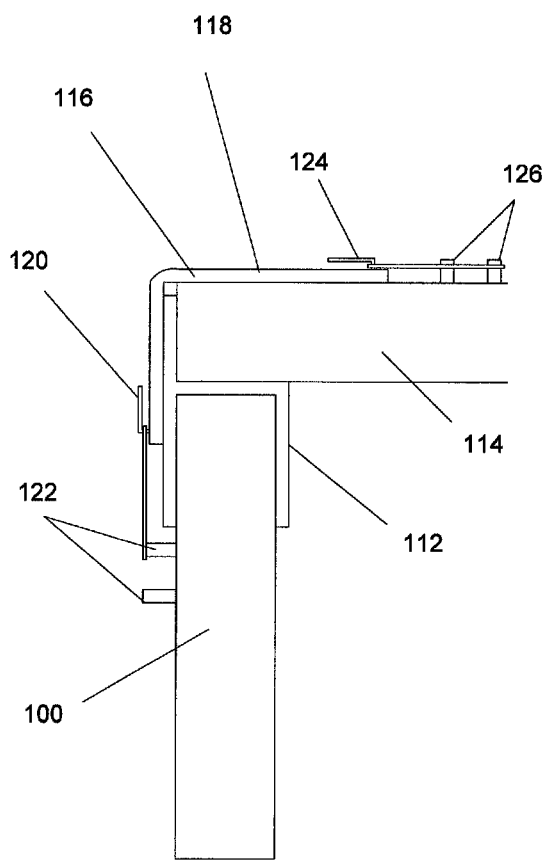
FIG. 20 is a diagrammatic illustration of a cross-section view of the wall panel shown in FIG. 18 coupled to a ceiling panel.

The top of the external walls are fitted with a capping 112 in the manner shown in FIG. 20. The capping 112 is a "h" shaped metal extrusion that preferably extends along the length of each external wall 100. The capping 112 is alternatively made of any other suitable material capable of transferring forces applied to the top of the wall panels 100 across a broad area. The two parallel sides of the "h" shaped capping straddle the upper section of the wall panels 112.

b. Ceiling

The ceiling panels 114 shown in FIG. 20 are made in a number of different sizes. For example, the ceiling panels 114 can have the following dimensions:

i. 3600 mm by 900 mm (maximum);
ii. 2700 mm by 900 mm; and
iii. 900 mm by 900 mm (minimum).

The ceiling panels 114 preferably have a sandwich panel construction. Alternatively, any suitable material could be used.

The ceiling panels 114 are fitted in positions on top of the wall panels 100 in the manner shown in FIG. 20, where they abut the upper section of the "h" shaped capping 112. Neighbouring ceiling panels 114 preferably include corresponding male and female connectors (not shown) to facilitate mutual coupling. The ceiling panels 114 include one or more access panels so that the jacks in the roof (described below) can be accessed.

c. Exoskeleton

The ceiling panels 114 and the wall panels 100 are coupled together by an exoskeleton 116 in the manner shown in FIG. 20. The exoskeleton 116 includes an "L" shaped extrusion 118 arranged to extend over an edge of the ceiling panels 114 and the top of the wall panels 100. The section of the "L" shaped extrusion 118 that extends over the top of the wall panels 100 includes a plurality of fasteners 120 arranged for engagement with corresponding fasteners 122 of the wall panels 100. The fasteners 120, 122 are preferably interlocking male and female connectors coupled to respective sections of the extrusion 118 and the wall panels 100 by way of at least partially resiliently stretchable straps (not shown). Alternatively, the fasteners 120, 122 of the extrusion 118 and the wall panels 100 are corresponding pairs of hooks and lugs coupled respective sections of the extrusion 118 and the wall panels 100, the pairs of lugs and hooks being coupled together by way of resilient bands, for example.

Similarly, the section of the "L" shaped extrusion 118 that extends over the ceiling panels 114 includes a plurality of fasteners 124 arranged for engagement with corresponding fasteners 126 of the ceiling panels 114. The fasteners 124, 126 are preferably interlocking male and female connectors coupled to respective sections of the extrusion 118 and the ceiling panels 114 by way of at least partially resiliently stretchable straps (not shown). Alternatively, the fasteners 124, 126 of the extrusion 118 and the ceiling panels 114 are corresponding pairs of hooks and lugs coupled to respective sections of the extrusion 118 and the ceiling panels 114, the pairs of lugs and hooks being coupled together by way of a resilient band.

In the above described arrangement, the extrusion 118 is used to quickly couple the wall panels 100 to the ceiling panels 114. The fasteners 120, 122, 124, 126 can preferably be adjusted to tension the wall panels 100 and the ceiling panels 114 to suit the needs of the application. The exoskeleton 116 advantageously permits the clusters 20 to flex rather than to remain rigid in potentially extreme weather conditions such as gale force winds or snow/sand storms.

3. Roof Structure

Figure 21:
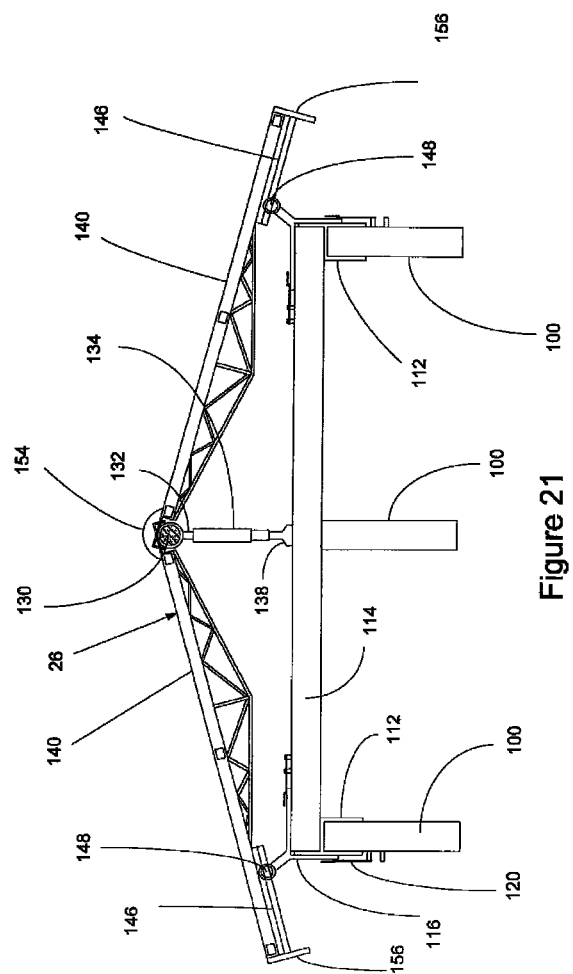
FIG. 21 is a diagrammatic illustration of a cross-section view of the roof structure shown in Figure through the line X-X.
Figure 22:
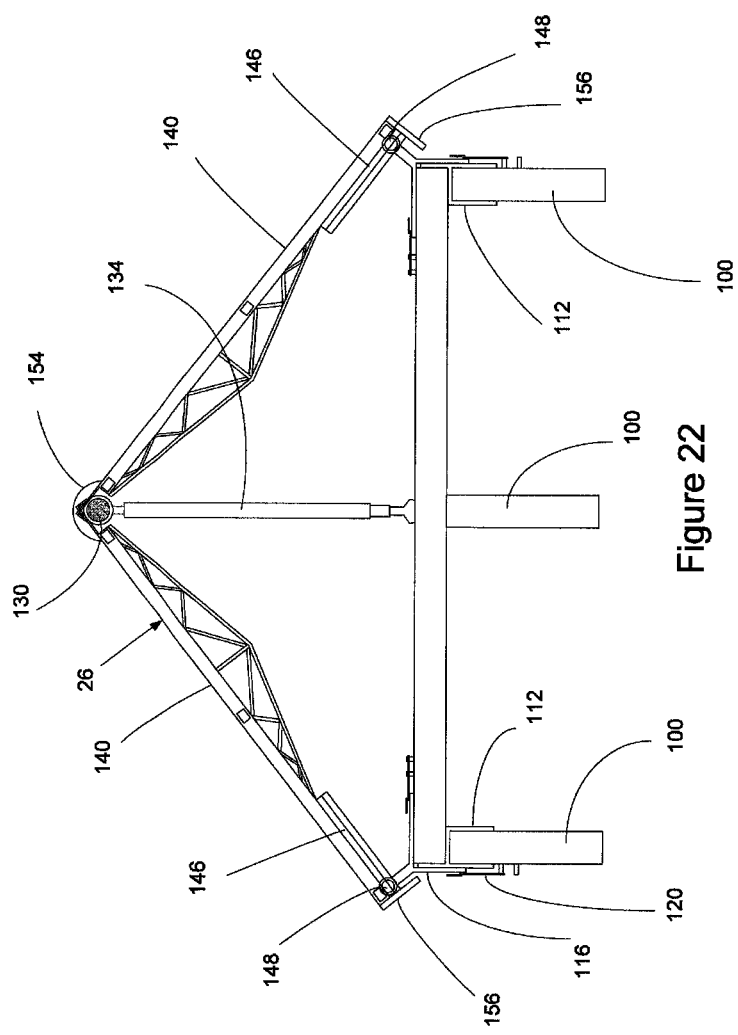
FIG. 22 is a diagrammatic illustration of a cross-section view of the roof structure shown in FIG. 21 arranged in another condition of use.

The roof structure 26 has been designed to be coupled to the walls 100 and ceiling 114 in such a way that the pitch of the roof can be adjusted to suit the needs of the location where the cluster 20 is being erected. For example, the roof structure 26 shown in FIG. 21 has been lowered to reduce the pitch of the roof and extend the eaves to provide additional shade for a hot location or increased catchment area. Similarly, the roof structure 26 shown in FIG. 22 has been raised to increase the pitch of the roof and reduce the eaves to provide additional light for a cool location. The pitch can be adjusted within the range of 40 degrees to 5 degrees, for example. The steps involved in constructing the roof structure are described in detail below.

The ceiling access panels 114 are used to locate the centre ridge support beam 130 over an internal divisional wall 100 or internal columns. The ridge 130 preferably has a circular cross-section to allow pivoting/rotation of fasteners as the pitch of the roof changes.

Annular ridge pins 132 of a plurality of ridge jacks 134 are then threaded, or pushed, onto the ridge 130 and, when so arranged, the pins 132 are then reconnected to back on to corresponding ridge jacks 134. The annular pins 132 include a screw thread for coupling to a corresponding screw thread of the jack 134. The pin 132 is preferably made of hard plastic.

The ridge jacks 134 are typically arranged at mid points of the expected positions of the roof frames (described in detail below). The ridge 130 and the ridge jacks 134 are stood up over internal walls 100, or centre support points. The jacks 134 are then adjusted to a standard roof pitch, or a pitch to suit climate or season. The jacks 134 preferably hand screw up into ridge jack pin 132. The jacks 134 are preferably ratchet type, multi staged, to allow for quick installation. The jacks 134 preferably include pre-made notches to indicate typical roof pitches. The jack base 138 is flexible to allow off-set.

Figure 23:
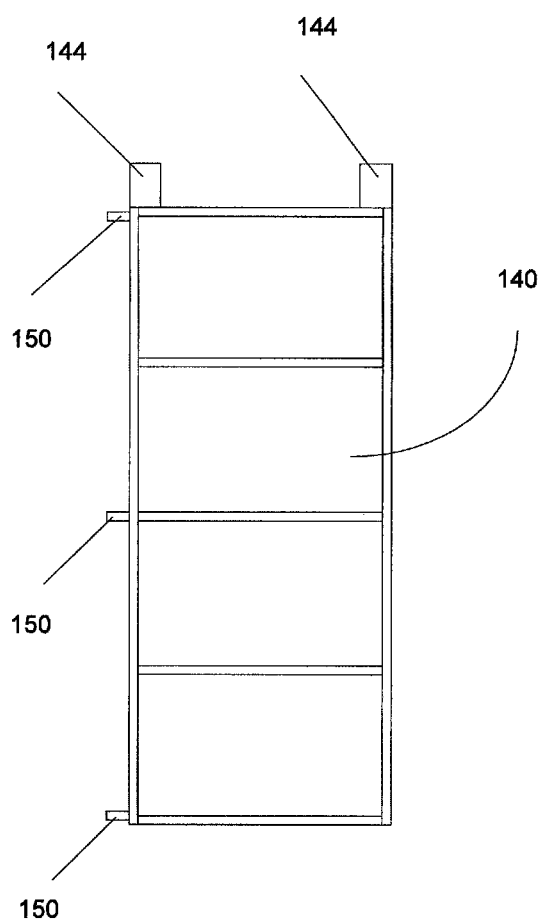
FIG. 23 is a diagrammatic illustration of a top view of a roof panel.
Figure 24:
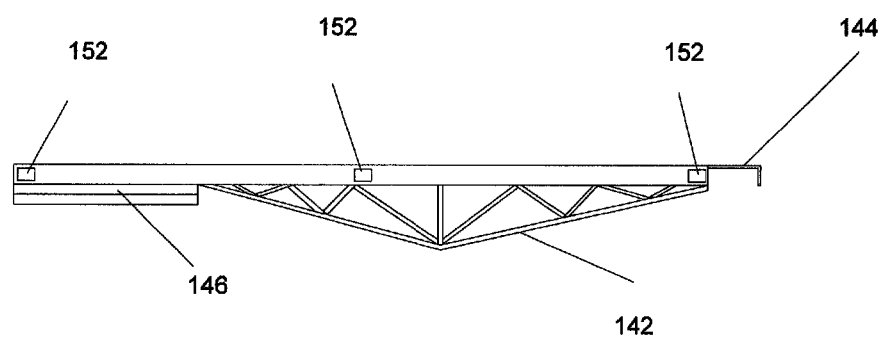
FIG. 24 is a diagrammatic illustration of a side view of the roof panel shown in FIG. 23.

With the ridge 130 supported by the jacks 134 at the desired height, a first roof panel 140, of the type shown in FIGS. 23 and 24, is then fitted. The roof panels 140 are generally rectangular in shape and made of a light weight non-corrosive material. The width of the roof panel 140 is preferably determined by the roof sheeting cover. Length of the roof panel 140 is suitable to cover the roof span. Roof sheeting, such as corrugated iron or plastic, is fixed directly to the roof panel 140. An underside section of the roof panel 140 includes a fulcrum truss 142 which provides additional strength to the roof structure 26.

A top end of the roof panel 140 includes fasteners 144 for coupling the roof panel to the ridge 130. The fasteners 144 are preferably first and second hooks that are shaped to be fitted over the ridge 130. In this embodiment, a ridge locking pin (not shown) is used to lock the hooks 144 of the roof frames 140 to the ridge 130 once they are all in position. Alternatively, the fasteners 144 are clasps adapted to be fitted around, and to be secured to, the ridge 130 by way of one or more screws. The clasps require a tool and removes need for the above-described locking pin.

Importantly, a side section of the roof panel 140 includes an elongate channel 146 that extends from a bottom section of the roof panel 140 towards the top end of the roof panel 140. The length of the channel 146, hereafter referred to as a roof slide 146, dictates the range of movement, or pitch, of roof structure 26. The roof slide 146 is shaped to mate with a roof slide pivot 148 coupled to the "L" shaped extrusion 118 of the exoskeleton 116. When so arranged, the pivot 148 is at least partially seated within the roof slide channel 146 and is adapted to move back and forth along the channel 146, in the manner shown in FIGS. 21 and 22, in accordance with raising and lowering of the ridge 130 caused by movement of the ridge jacks 134.

The next roof panel 140 is then fitted to the other side of the roof structure 26 in the same manner as that of the first roof panel 140. This process is continued towards prevailing weather. This allows the overlap to weather proof the roof. Neighbouring roof panels 140 are coupled together by interlocking pairs of spigots 150 and corresponding recesses 152.

Progressively, for a corrugated roof deck, a flexible ridge capping 154 is also fitted to the roof structure 26. The roof capping 154 is preferably canvas or water proof rubber coupled to the roof panels 140 by fasteners such as press studs. Alternatively, the capping 154 can be any other suitable material that facilitates movement changeable roof pitch. The roof structure 26 is thereby weather proofed.

The number of roof panels 140 that couple together determine the run of the roof. For example, there may be 38 roof panels 140 per cluster 20. Install stop ends (not shown) as required. Facia panels 156 connected to bottom end sections of the roof panels 140 strengthen ends of span and slide as well as holding a gutter (not shown). The gutter is preferably adapted to collect rain water for use by the occupants. When completed, the roof sheets preferably overlap one another by a trough or a crest.

The roof structure 26 is preferably raised or lowered via jacks, or some suitable form of hydraulics. The pitch of the roof structure 26 can be raised or lowered by way of a self adjusting mechanism to best suit the time and latitude of location. That is, it can be readjusted to track between summer and winter and prevailing weather conditions at the time.

Figure 25:
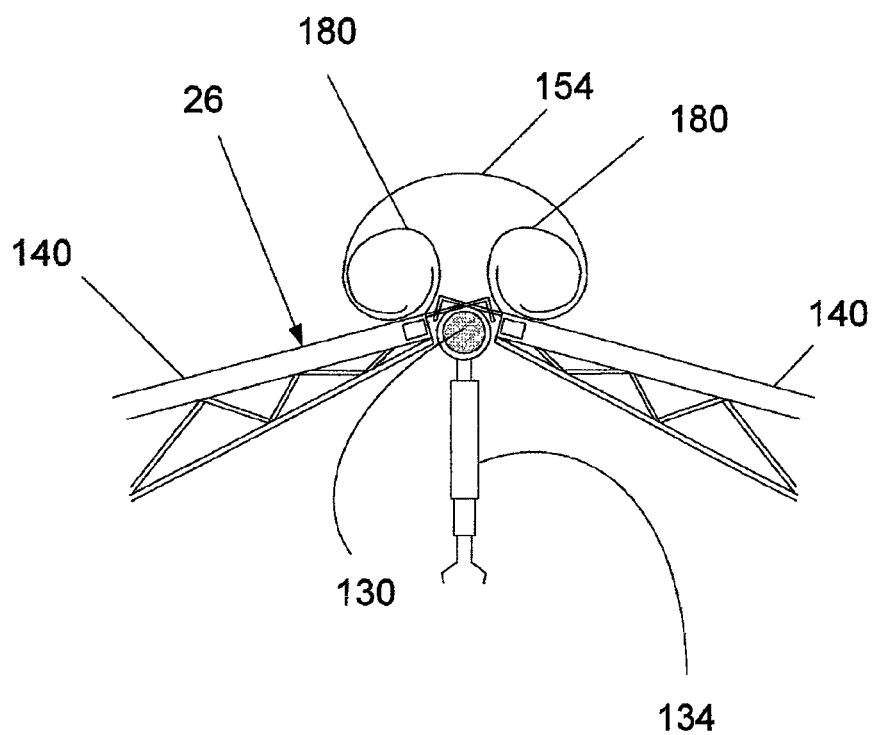
FIG. 25 is a diagrammatic illustration of a cross-section view of fasteners of the roof panel.

The roof panels 140 preferably include the capping hinges 180 arranged for coupling with a ridge capping 154 in the manner shown in FIG. 25. The capping hinges 180 are preferably scrolled along the upper end of the roof panels in a manner that facilitates connection with corresponding scrolled sections of the ridge capping 154. When so arranged, the capping hinges 180 and the ridge capping 154 inhibit ingress of rain and dust, for example, into the roof structure 26. The capping hinges 180 and the ridge capping are preferably resiliently flexible to permit movement of the roof panels 140 as the roof structure changes pitch.

Once the above described steps have been completed, the internal fittings can be installed and services connected. Water and effluent are stored below floor in one or more bladders. Electricity is preferably provided via the roof cavity. The cluster is then ready for medium term habitation.

The roof panels 140 preferably include solar panels that are adapted to charge collector batteries (not shown).

In alternative embodiment, the roof panels 140 on a first side of the ridge member 130 are coupled to the walls 100 with a fixed pivot and the roof panels 140 on the opposite second side of the ridge member 130 are slidably coupled to the walls with the above described lugs 148 and channels 146. In this embodiment, when the jacks 134 raise the ridge member 130, the roof panels 140 on the first side of the ridge member 130 pivot about respective pivots and the lugs 148 of roof panels on the second side of the ridge member 130 slide along respective channels 146. The result being that the ridge member 130 shifts laterally towards the first side of the ridge member 130. The opposite occurs when the jacks 134 are lowered. The above described arrangement may be advantageous when the roof structure 26 is located on a title boundary.

The roof structure 26 is preferably adapted to be used for any walled structure such as a domestic house or a shed.

The jacks 134 are preferably hydraulically operated to change the pitch of the roof structure 26 by raising and lowering the ridge member 130. The hydraulic jacks 134 are preferably remotely controlled by a computer device (not shown). The computer device is preferably adapted to change the pitch of the roof to suit the needs of each season. The computer device is preferably adapted to change the pitch of the roof so that solar panels overlayed on the roof structure 26 are arranged at an optimal angle to collect solar energy. The computer device can be used to track the sun from sun rise to sunset.

The computer device preferably includes a climatic control system used to change the pitch of the roof to suit the current weather conditions. For example, the roof can be raised to collect rain during a windy rain storm. Alternatively, the roof can be lowered during light rain to increase the rain collecting area.

Planned Response

Based on Australia with an assumption that the country has 20 million people.

a. Locally

Have a single cluster per 50,000 population located locally. For example, Australia would have 400 clusters on standby. Across regional centres. For example, Mildura, Bendigo, Wadonga, etc.

b. Regionally

Located at main transport hubs around the country, each being capable of housing 10,000+ people for a single disaster. For example, 150 clusters for each main city or state. Therefore, Australia would need 900 clusters located regionally. For example, Victoria, New South Wales, Queensland, South Australia, and Western Australia have 150 clusters each. Northern Territory and Tasmania have 75 clusters each. Therefore, the total of clusters around Australia is 900 for regional/state response.

c. Nationally

Capable of 2.5% of the population. In Australia, assuming that we have 25 million people, we would have to cater for 625,000 people. Assuming each cluster accommodates 72 people. therefore Australia would need to have 8,680 clusters to accommodate 2.5% of the population.

Given the above considerations, Australia would need 400+900+8680=9,980 clusters Cost for Australia is 5.64 billion dollars. That is, $225.6 per person.

Although preferred embodiments of the invention have been above described with reference to accommodation for people displaced as a result of a natural disaster, preferred embodiments of the invention are equally suitable for use in military, mining, and construction applications where deployment of medium term accommodation is needed.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge in Australia.

The invention claimed is:

1. A dwelling for emergency housing for displaced people, including:
   (a) a base structure;
   (b) a plurality of walls coupled to the base structure having "L" shaped extrusions coupled to the walls;
   (c) a roof structure coupled to the walls,
   the roof structure including a plurality of roof panels coupled to a ridge beam, wherein the roof panels comprise a roof slide shaped to mate with a roof slide pivot coupled to and extending from an apex of a respective one of the "L" shaped extrusions, wherein the roof slide pivot is configured to mate with a respective roof slide at a position remote from the apex so that the roof slide pivot is arranged to translate and rotate along and about the roof slide when a pitch of the roof structure moves through a range of movement; and
   (d) one or more jacks seated in the roof structure, coupled between the ridge beam and the walls, and operable to selectively raise and lower the ridge beam so as to change a pitch of the roof structure of the constructed dwelling to accommodate changes in the environmental conditions,
   wherein the roof panels are rotatably coupled to the ridge beam and slidably coupled to the walls so that the roof panels rotate with respect to the ridge beam and translate with respect to the walls in accordance with changes in pitch of the roof structure caused by the one or more jacks.

2. The dwelling claimed in claim 1, wherein each wall of said plurality of walls is coupled to the base structure by one or more fasteners.

3. The dwelling claimed in claim 2, wherein the fasteners include corresponding lugs and recesses of the walls and base support structure.

4. The dwelling claimed in claim 2, wherein the fasteners are compression locating pins.

5. The dwelling claimed in claim 1, wherein the roof panels include fulcrum trusses.

6. A dwelling for emergency housing for displaced people, including:
   (a) a base structure;
   (b) a plurality of walls coupled to the base structure;
   (c) a roof structure coupled to the walls,
   the roof structure including a plurality of roof panels coupled to a ridge beam; and (d) one or more jacks seated in the roof structure, coupled between the ridge beam and the walls, and operable to selectively raise and lower the ridge beam so as to change a pitch of the roof structure of the constructed dwelling to accommodate changes in the environmental conditions,
   wherein the roof panels are rotatably coupled to the ridge beam and slidably coupled to the walls so that the roof panels rotate with respect to the ridge beam and translate with respect to the walls in accordance with changes in pitch of the roof structure caused by the one or more jacks, wherein the base structure includes:
      (i) a plurality of base support panels coupled together by fasteners;
      (ii) a plurality of base support jacks for supporting the base support panels over a floor or ground surface;
      (iii) a plurality of edge supports that define a raised perimeter around the base support panels;
      (iv) a plurality of floor supports coupled to and extending upwardly from a planar surface of the base support panels; and
      (v) a plurality of floor panels coupled to the edge supports and the floor supports.

7. The dwelling claimed in claim 6, wherein the fasteners are bowtie connectors seated in corresponding bowtie recesses of the base support panels.

8. The dwelling claimed in claim 6, wherein the base support jacks have adjustable length to suit the needs of the terrain on which the dwelling is assembled.

9. The dwelling claimed in claim 6, wherein the base support jacks include footings for engaging the floor or ground surface.

10. The dwelling claimed in claim 6, wherein the edge supports are arranged in series around the perimeter of the base support.

11. The dwelling claimed in claim 6, wherein the edge supports are coupled together by way of alternating bowtie recesses and corresponding bowtie connectors.

12. The dwelling claimed in claim 6, wherein the floor supports are arranged across said planar surface at substantially equally spaced apart distances.

13. The dwelling claimed in claim 6, wherein the base structure includes a bladder seated in a recess defined by the planar surface of the base support panels and the edge supports.

14. The dwelling claimed in claim 13, wherein the bladder includes a plurality of apertures extending therethrough, the apertures being shaped to receive respective ones of the floor supports coupled to and extending upwardly from a planar surface of the base support panels.

15. The dwelling claimed in claim 13, wherein the bladder is walled and generally rectangular in cross-section.

16. The dwelling claimed in claim 13, wherein the bladder includes an inlet port for pumping water into the bladder.

17. The dwelling claimed in claim 13, wherein the bladder includes an outlet port for drawing liquid from the bladder.

18. The dwelling claimed in claim 13, wherein the bladder is adapted to store water.

19. The dwelling claimed in claim 18, wherein the bladder includes a water purification system.

20. The dwelling claimed in claim 13, wherein the bladder functions as a ballast anchoring the base support structure to a floor or ground surface.

21. The dwelling claimed in claim 6, wherein the base support structure includes two bladders seated in a recess defined by the planar surface of the base support panels and the edge supports.

22. The dwelling claimed in claim 21, wherein each bladder of said bladders includes a plurality of apertures extending therethrough, the apertures being shaped to receive respective ones of said floor supports so that they extend through the bladder.

23. The dwelling claimed in claim 6, wherein the floor panels provide a generally planar floor surface.

24. The dwelling claimed in claim 6, wherein the walls include a plurality of wall panels made of sandwich panel construction.

25. The dwelling claimed in claim 6, including a plurality of ceiling panels coupled to the walls.

26. The dwelling claimed in claim 25, including a "h" shaped capping that fits over common upper ends of the walls, wherein common ends of the ceiling panels are seated on and abut against the "h" shaped capping.

27. The dwelling claimed in claim 25, wherein ceiling panels are coupled to the walls by fasteners.

28. The dwelling claimed in claim 27, wherein the fasteners extend between the ceiling panels and the walls.

29. The dwelling claimed in claim 27, wherein the fasteners include the "L" shaped extrusions formed as members that at least partially overlie the ceiling panels and at least partially overlie the walls.

30. The dwelling claimed in claim 29, wherein the members include a fasteners for coupling to ceiling panels and fasteners for coupling to the walls.

31. A dwelling for emergency housing for displaced people, including:
   (a) a base structure;
   (b) a plurality of walls coupled to the base structure having "L" shaped extrusions coupled to the walls;
   (c) a roof structure coupled to the walls,
   the roof structure including a plurality of roof panels coupled to a ridge beam; and
   (d) one or more jacks seated in the roof structure, coupled between the ridge beam and the walls, and operable to selectively raise and lower the ridge beam so as to chance a pitch of the roof structure of the constructed dwelling to accommodate changes in the environmental conditions,
   wherein the roof panels are rotatably coupled to the ridge beam and slidably coupled to the walls so that the roof panels rotate with respect to the ridge beam and translate with respect to the walls in accordance with changes in pitch of the roof structure caused by the one or more jacks,
   wherein the roof panels are coupled to the walls by roof slide pivots extending from an apex of a respective one of the "L" shaped extrusions into elongate channels of the roof panels, the roof slide pivots being configured to mate with a respective channel at a position remote from the apex so that the roof slide pivot is adapted to rotate and translate along and about a respective channel in accordance with changes in pitch of the roof structure through a range of movement.

32. A roof structure for a dwelling having a plurality of walls extending upwardly from a base structure, including:
   (a) a plurality of roof panels and "L" shaped extrusions coupled to the walls, wherein the roof panels comprise a roof slide shaped to mate with a roof slide pivot, the roof slide pivot coupled to and extending from an apex of a respective one of the "L" shaped extrusions, wherein the roof slide pivot is configured to mate with a respective roof slide at a position remote from the apex so that the roof slide pivot is arranged to translate and rotate along and about the roof slide when a pitch of the roof structure moves through a range of movement;

(b) a ridge beam; and (c) one or more jacks seated in the roof structure, coupled between the ridge beam and the walls, and operable to selectively raise and lower the ridge beam so as to change a pitch of the roof structure of the constructed dwelling to accommodate changes in environmental conditions, wherein the roof panels are rotatably coupled to the ridge beam and slidably coupled to the walls so that the roof panels rotate with respect to the ridge beam and translate with respect to the walls in accordance with changes in pitch of the roof structure caused by the one or more jacks.

33. The roof structure claimed in claim 32, wherein the roof panels include fulcrum trusses.

34. A roof structure for a dwelling having a plurality of walls extending upwardly from a base structure, including:

(a) a plurality of roof panels comprising elongate channels and "L" shaped extrusions coupled to the walls;

(b) a ridge beam; and (c) one or more lacks seated in the roof structure, coupled between the ridge beam and the walls, and operable to selectively raise and lower the ridge beam so as to change a pitch of the roof structure of the constructed dwelling to accommodate changes in environmental conditions, wherein the roof panels are rotatably coupled to the ridge beam and slidably coupled to the walls so that the roof panels rotate with respect to the ridge beam and translate with respect to the walls in accordance with changes in pitch of the roof structure caused by the one or more jacks, and wherein the roof panels are coupled to the walls by roof slide pivots extending from an apex of a respective one of the "L" shaped extrusions into the elongate channels of the roof panels, the roof slide pivots being configured to mate with a respective channel at a position remote from the apex so that the roof slide pivot is adapted to rotate and translate along respective channels in accordance with changes in pitch of the roof structure through a range of movement.

* * * * *